Figures 1, 1A:
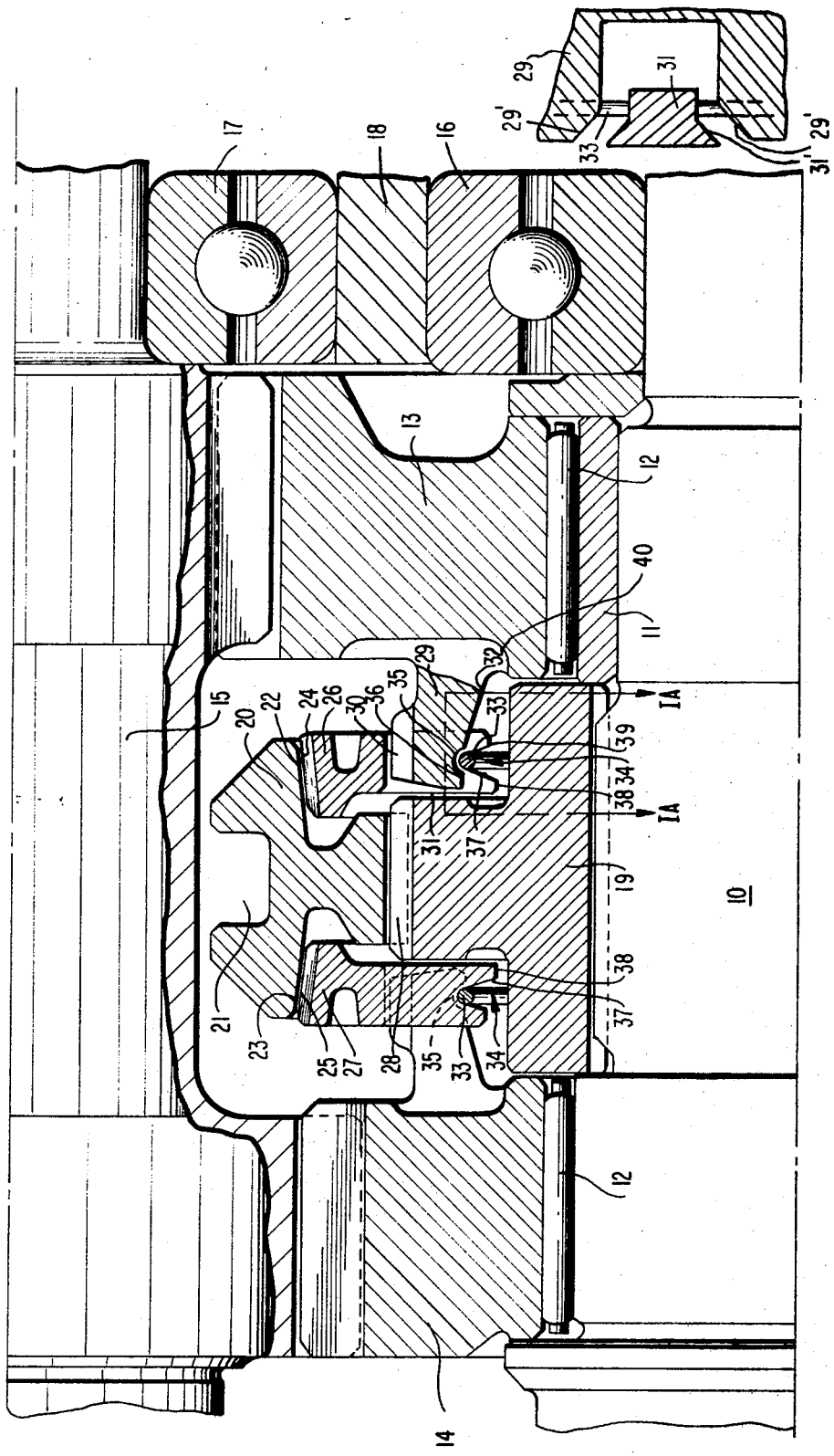

United States Patent [19]
Wörner

[11] 3,737,016
[45] June 5, 1973

[54] BLOCKING SYNCHRONIZATION FOR CHANGE-SPEED TRANSMISSIONS OF MOTOR VEHICLES

[75] Inventor: Günter Wörner, 7053 Rommelshausen, Germany

[73] Assignee: Daimler-Benz Aktiengesellschaft, Stuttgart-Unterturkheim, Germany

[22] Filed: Nov. 30, 1971

[21] Appl. No.: 203,238

[30] Foreign Application Priority Data

Dec. 2, 1970 Germany.................P 20 59 218.1

[52] U.S. Cl..............................................192/53 F
[51] Int. Cl...............................................F16d 23/06
[58] Field of Search............................192/53 E, 53 F

[56] References Cited

UNITED STATES PATENTS

| 3,035,674 | 5/1962 | Peras | 192/53 F |
| 3,175,412 | 3/1965 | Peras | 192/53 F X |

Primary Examiner—Allan D. Herrmann
Attorney—Craig, Antonelli & Hill

[57] ABSTRACT

A blocking synchronization for a gear-type change-speed transmission, especially for motor vehicles, in which a shifting sleeve is non-rotatably but axially displaceably arranged on a carrier and is provided with coupling teeth for the engagement in corresponding counter teeth at a gear; the shifting sleeve is additionally provided with an internal conical surface for the cooperation with the external conical surface of a synchronizing ring which by means of radially inwardly projecting extensions is within limits rotatable and axially displaceable against spring action within apertures of an annular gear extension projecting from the gear toward the shifting sleeve and carrying the counter teeth; inclined surfaces are also provided at the extensions of the synchronizing ring for the cooperation with correspondingly inclined blocking surfaces provided at the sides of the apertures; the inwardly facing circumferential surface at the annular extension of the gear is constructed as a conical abutment surface for the abutment of an annular spring whereby this abutment surface increases in diameter in the direction toward the shifting sleeve while the annular spring is arranged in an annular groove of the extensions of the synchronizing ring which annular groove is open in the radially inward direction.

14 Claims, 2 Drawing Figures

BLOCKING SYNCHRONIZATION FOR CHANGE-SPEED TRANSMISSIONS OF MOTOR VEHICLES

The present invention relates to a synchronization for gear-type change-speed transmissions, especially for motor vehicles with a shifting sleeve non-rotatably, but axially displaceably arranged on a carrier and provided with coupling teeth for the engagement in corresponding counterteeth at the gear wheel and with an inwardly facing conical surface for the cooperation with the external cone of a synchronizing ring, which by means of radially inwardly projecting extensions is rotatably movable within limits in recesses or apertures of an annular extension projecting from the gear wheel toward the shifting sleeve and carrying a counter-tooth system and which is axially displaceable against spring-action, whereby inclined surfaces at the extensions of the synchronizing ring for the cooperation with correspondingly inclined blocking surfaces are arranged at the sides of the recess.

With synchronizations of the aforementioned type, there always exists the desire to reduce the axial structural length of such a structural group and yet to produce thereby an adequate blocking or deflecting force at the synchronizing ring. This task is solved in accordance with the present invention with the synchronizations described above in that the inwardly facing circumferential surface at the annular extension of the gear wheel is constructed as a conical abutment surface intended for the abutment of an annular spring, with the diameter of this conical abutment surface increasing in the direction toward the shifting sleeve, and in that the annular spring is arranged at the synchronizing ring in an annular groove of the extensions, which is open in the inward direction.

It is possible in an advantageous manner by the proposal of the present invention to nest within one another, so to speak of, the individual elements of such a synchronization so that very little space is required in the axial direction. Additionally, the synchronizing ring is pressed by the ring spring with its friction surface against the shifting sleeve as soon as the latter leaves its normal position. A sufficient friction force is produced in this manner and the synchronization can take place rapidly in this manner.

In one embodiment according to the present invention, the conical abutment surface at the extension of the gear is provided at its end facing the shifting sleeve with an abutment as stroke or travel limitation for the synchronizing ring. In this manner, the annular spring can fulfill two functions, so to speak of, in that in cooperation with the abutment it determines additionally the normal position of the synchronizing ring and prevents that the synchronizing ring possibly continues to stick to the conical surface of the shifting sleeve. In particular, it is then proposed in that connection that at the end of the abutment surface facing the shifting sleeve possibly between the end of the abutment surface and the abutment, an annular groove is provided which slightly exceeds in its dimensions an annular groove at the extensions of the synchronizing ring. In this manner during the reversal of the direction of rotation, the shifting of the synchronizing ring is greatly facilitated since the annular spring has a certain play with respect to the annular groove in the annular extension of the gear wheel.

It is additionally proposed by the present invention that the flanks of the ring groove at the extensions of the synchronizing ring are so inclined that this annular groove is enlarged in the inward direction. It may thereby be particularly advantageous if corresponding to a further feature according to the present invention, the flank of the annular groove disposed on the shifting sleeve side is so inclined at the extensions of the synchronizing ring that it is disposed approximately at right angle to the abutment surface. In this manner, the lateral force produced by the annular spring is absorbed in the most favorable manner.

Accordingly, it is an object of the present invention to provide a blocking synchronization for gear-type change-speed transmissions, especially for motor vehicles which avoids by simple means the aforementioned shortcomings and drawbacks encountered in the prior art.

Another object of the present invention resides in a synchronization installation for change-speed gears which permits a reduction in the axial length while assuring adequate blocking forces at the synchronizing ring.

A further object of the present invention resides in a synchronization for change-speed transmissions, especially of motor vehicles, in which the individual elements can be nested one within the other to minimize the axial space requirements.

A still further object of the present invention resides in a compact synchronization which produces sufficient friction forces to assure rapid synchronization.

These and further objects, features and advantages of the present invention will become more apparent from the following description when taken in connection with the accompanying drawing which shows, for purposes of illustration only, one embodiment in accordance with the present invention, and wherein:

FIG. 1 is a partial cross-sectional view through one embodiment of a blocking synchronization of a motor vehicle change-speed transmission in accordance with the present invention; and FIG. 1A is a partial cross-sectional schematic view taken along line IA—IA of FIG. 1.

Referring now to the drawing, two gear wheels 13 and 14 are freely rotatably supported on a shaft 10—which may be the main shaft of the transmission—by means of the bearings 11 and 12. The gears 13 and 14 are in meshing engagement with corresponding counter teeth which are made in one piece with the shaft 15—which may be the countershaft. Both shafts 10 and 15 are supported with the aid of the bearings 16 and 17 in the transmission housing 18, not illustrated in detail.

A shifting sleeve carrier 19 is non-rotatably and axially non-displaceably secured on the shaft 10 between the bearings 11 and 12. It receives a shifting sleeve 20 which is provided in a conventional manner with an annular groove 21 for the engagement of a shifting fork (not shown). The shifting sleeve 20 is additionally equipped with two inwardly directed conical surfaces 22 and 23 which cooperate in a conventional manner with external conical surfaces 24 and 25 at the synchronizing rings 26 and 27. The connection between the shifting sleeve carrier 19 and the shifting sleeve 20 takes place by means of a tooth system 28 which simultaneously represents the engaging tooth system of the shifting sleeve 20. The construction of the parts on both sides of the shifting sleeve 20 is symmetrical so that in the following description only one side thereof will be further described.

An annular extension 29 directed axially inwardly toward the shifting sleeve carrier 19 is arranged at the gear 13 which carries externally the engaging teeth 30, into which engage the engaging teeth 28 after a corresponding shifting movement of the sleeve 20. This annular extension 29 is interrupted at several places uniformly distributed over the circumference, for example, at three places, and extensions 31 provided at the synchronizing ring 26 project through these interruptions or apertures. The synchronizing ring 26 is therefore within limits movable in the circumferential direction and axially displaceable in these interruptions or apertures of the annular gear wheel extension 29. Deflecting or blocking surfaces are arranged in a conventional manner at the mutually facing side surfaces 31', 29' of the synchronizing ring 26 and of the annular extension.

The annular extension 29 is provided inwardly thereof with a conical abutment surface 32 whose diameter increases in the direction toward the shifting sleeve 20. This abutment surface 32 is intended for the abutment of a ring spring 33 which is guided in an inwardly open slot 34 at the extensions 31 of the synchronizing ring 26. The abutment surface 32 passes over at or near its inner end into an annular groove 35 which has a somewhat larger diameter than the annular groove 34 at the extensions 31 and which is also somewhat wider and deeper than the annular groove 34. As a result thereof, the annular spring 33 always abuts only at the bottom of the annular groove 34 and not at the annular groove 35 in the annular extension 29. An annular segment 36 is disposed at the annular extension 29 beyond the last-mentioned annular groove 35, i.e., in the direction toward the shifting sleeve 20, which acts as abutment for the ring spring 33 and prevents that the ring spring 33 and therewith the synchronizing ring 26 continues to stick or adhere at the shifting sleeve 20 during the return movement of the shifting sleeve into its center position.

As can be readily seen from the drawing, the annular groove 34 at the extensions 31 is enlarged in the inward direction. The inclination of the flank 37 is thereby so selected that it is disposed about at right angle to the abutment surface 32. In this manner, the lateral force of the annular spring 33—as soon as the same is on the abutment surface—is transmitted in the most favorable manner. It can be further seen from the drawing that the portion 38 at the extension 31, which is disposed closer toward the shifting sleeve 20, extends further inwardly than the portion 39 which faces the gear wheel. In this manner, the gear 13 can be constructed more favorably at the base 40 without producing disadvantageous effects during the return movement of the synchronizing ring 26.

OPERATION

The operation of the synchronization described hereinabove is generally known as such and is also believed apparent without further explanation from the drawing. If the shifting sleeve 20 moves, for example, toward the right, for coupling the gear 13 to the shaft 10, then at first the synchronizing ring 26 is taken along toward the right whereby the synchronizing ring runs up against the deflecting or blocking surfaces (not shown) of conventional construction and prevents the shifting sleeve 20 from its further movement toward the right as long as a rotational speed difference prevails. The annular spring 13 has thereby reached the abutment surface 32 and produces thereat a sufficient force for the abutment of the synchronizing ring 26 by means of its conical surface 24 at the shifting sleeve 20. Only during synchronism, the synchronizing ring 26 can enter with its lateral extensions 31 between the blocking surfaces so that now the engaging teeth 28 can be inserted into the teeth 30 at the annular extension 29. Also, in the engaging position, the ring spring 33 on the abutment surface 32 exerts on the synchronizing ring 26 a return force direction in the direction toward the shifting sleeve 20. During the return movement, however, the annular spring 33 abuts at the ring segment 36, which acts a travel limit for the spring 33, shortly before reaching the center position of the shifting sleeve 20 so that the synchronizing ring 26 is axially held fast whereas the shifting sleeve 20 continues to move up to its exact center position. The conical surfaces 22 and 24 thereby separate from one another.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A blocking synchronizing installation for gear-type change-speed transmission, especially for motor vehicles, including a shifting sleeve which is non-rotatably but axially displaceably arranged on a carrier, provided with coupling teeth means for the engagement in corresponding counterteeth means at a gear and with an inwardly directed conical surface means for the cooperation with an external conical surface means provided at a synchronizing ring means, the gear being provided with an annular extension extending in the direction toward the shifting sleeve and carrying the counterteeth means, and in which the synchronizing ring means with radially inwardly projecting extensions is within limits rotatable within aperture means provided in the annular extension of the gear and axially displaceable against spring action, inclined surfaces being provided at the extensions of the synchronizing ring means for the cooperation with correspondingly inclined blocking surfaces at the sides of the aperture means, characterized in that the inwardly facing circumferential surface at the annular extension of the gear is constructed as a conical abutment surface means for the abutment of a ring spring, the conical abutment surface means increasing in diameter thereof in the direction toward the shifting sleeve, and in that the ring spring is arranged in an inwardly open annular groove of the extensions at the synchronizing ring means.

2. A blocking synchronizing installation according to claim 1, characterized in that the conical abutment surface means is provided at the end thereof facing the shifting sleeve with an abutment means as travel limit for the synchronizing ring means.

3. A blocking synchronizing installation according to claim 2, characterized in that said abutment means is a ring segment.

4. A blocking synchronizing installation according to claim 2, characterized in that an annular groove is provided at least near the end of the abutment surface means facing the shifting sleeve whose diameter, width and depth slightly exceed those of the annular groove at the extensions of the synchronizing ring means.

5. A blocking synchronizing installation according to claim 4, characterized in that the annular groove provided at the end of the abutment surface means is arranged between the latter and the abutment means.

6. A blocking synchronizing installation according to claim 4, characterized in that the flanks of the annular groove at the extensions of the synchronizing ring means are so inclined that the last-mentioned annular groove is enlarged in the inward direction.

7. A blocking synchronizing installation according to claim 6, characterized in that the flank of the annular groove at the extensions of the synchronizing ring means which is disposed on the shifting sleeve side is so inclined that it is disposed approximately at right angle to the abutment surface means.

8. A blocking synchronizing installation according to claim 7, characterized in that said abutment means is a ring segment.

9. A blocking synchronizing installation according to claim 8, characterized in that the annular groove provided at the end of the abutment surface means is arranged between the latter and the abutment means.

10. A blocking synchronizing installation according to claim 1, characterized in that an annular groove is provided at least near the end of the abutment surface means facing the shifting sleeve whose diameter, width and depth slightly exceed those of the annular groove at the extensions of the synchronizing ring means.

11. A blocking synchronizing installation according to claim 10, characterized in that the annular groove provided at the end of the abutment surface means is arranged between the latter and the abutment means.

12. A blocking synchronizing installation according to claim 1, characterized in that the flanks of the annular groove at the extensions of the synchronizing ring means are so inclined that the annular groove is enlarged in the inward direction.

13. A blocking synchronizing installation according to claim 12, characterized in that the flank of the annular groove at the extensions of the synchronizing ring means which is disposed on the shifting sleeve side is so inclined that it is disposed approximately at right angle to the abutment surface means.

14. A blocking synchronizing installation according to claim 1, characterized in that the flank of the annular groove at the extensions of the synchronizing ring means which is disposed on the shifting sleeve side is so inclined that it is disposed approximately at right angle to the abutment surface means.

* * * * *